C. A. CHESHIRE.

SIGNATURE GATHERER.

APPLICATION FILED NOV. 27, 1915.

Reissued Mar. 14, 1916.

14,084.

9 SHEETS—SHEET 1.

Witnesses:
C. E. Wesele.
B. G. Richards

Inventor:
Carey A. Cheshire,
By Joshua R. H. Porter
his Attorney.

C. A. CHESHIRE.
SIGNATURE GATHERER.
APPLICATION FILED NOV. 27, 1915.
Reissued Mar. 14, 1916.
14,084.
9 SHEETS—SHEET 2.
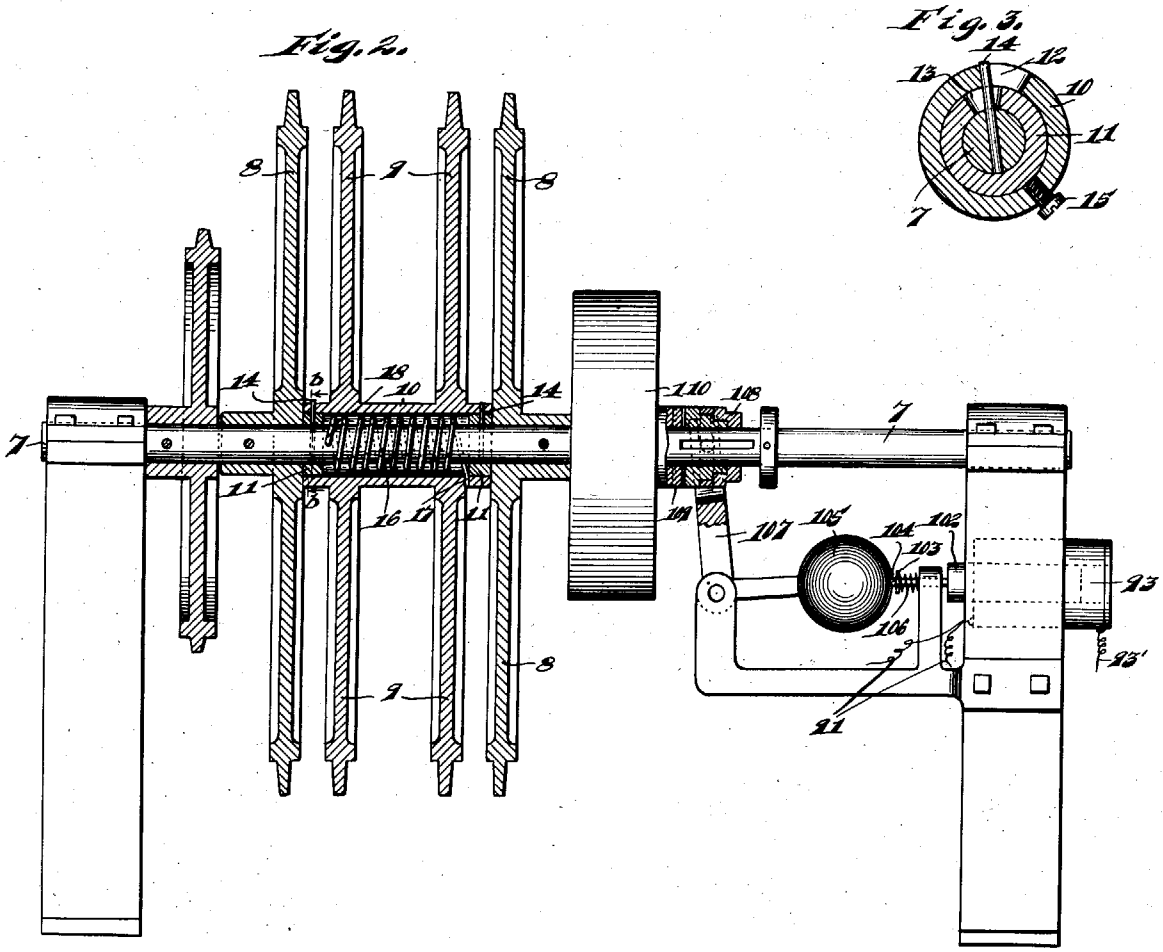
Witnesses:
C. E. Wessels.
B. G. Richards
Inventor:
Carey A. Cheshire,
By Joshua R. Sims
his Attorney.

C. A. CHESHIRE.

SIGNATURE GATHERER.

APPLICATION FILED NOV. 27, 1915.

Reissued Mar. 14, 1916.

14,084.

9 SHEETS—SHEET 3.

Witnesses:

C. E. Wessels.

B. G. Richards

Inventor:

Carey A. Cheshire,

By Joshua R. H. Sims his Attorney.

C. A. CHESHIRE.

SIGNATURE GATHERER.

APPLICATION FILED NOV. 27, 1915.

Reissued Mar. 14, 1916.

14,084.

9 SHEETS—SHEET 4.

Witnesses:
C. E. Wessels.
B. G. Richards

Inventor:
Carey A. Cheshire,
By Johnson & Porter
his Attorneys.

C. A. CHESHIRE.

SIGNATURE GATHERER.

APPLICATION FILED NOV. 27, 1915.

Reissued Mar. 14, 1916.

14,084.

9 SHEETS—SHEET 5.

C. A. CHESHIRE.

SIGNATURE GATHERER.

APPLICATION FILED NOV. 27, 1915.

Reissued Mar. 14, 1916.

14,084.

9 SHEETS—SHEET 6.

Witnesses:
E. C. Wessels.
B. G. Richards

Inventor:
Carey A. Cheshire,
By Joshua R. H. Fons
his Attorney.

C. A. CHESHIRE.

SIGNATURE GATHERER.

APPLICATION FILED NOV. 27, 1915.

Reissued Mar. 14, 1916.

14,084.

9 SHEETS—SHEET 7.

Witnesses:
E. E. Wessels.
B. G. Richards

Inventor:
Carey A. Cheshire,
By Joshua R. H. Sapp
his Attorney.

C. A. CHESHIRE.

SIGNATURE GATHERER.

APPLICATION FILED NOV. 27, 1915.

Reissued Mar. 14, 1916.

14,084.

9 SHEETS—SHEET 8.

Witnesses:
C. E. Wessels
B. G. Richards

Inventor:
Casey A. Cheshire,
By Joshua R. H. Topps
his Attorney.

C. A. CHESHIRE.

SIGNATURE GATHERER.

APPLICATION FILED NOV. 27, 1915.

Reissued Mar. 14, 1916.

14,084.

9 SHEETS—SHEET 9.

Witnesses:

C. E. Wessels.

B. G. Richards

Inventor:

Carey A. Cheshire,

By Joshua R. H. Potts his Attorney.

UNITED STATES PATENT OFFICE.

CAREY A. CHESHIRE, OF CHICAGO, ILLINOIS.

SIGNATURE-GATHERER.

14,084. Specification of Reissued Letters Patent. Reissued Mar. 14, 1916.

Original No. 1,147,481, dated July 20, 1915, Serial No. 771,003. Application for reissue filed November 27, 1915. Serial No. 63,889.

*To all whom it may concern:*

Be it known that I, CAREY A. CHESHIRE, a citizen of the United States, and a resident of the city of Chicago, county of Cook, and State of Illinois, have invented certain new and useful Improvements in Signature-Gatherers, of which the following is a specification.

My invention relates to improvements in signature gatherers especially adapted for use in assembling book sections and has for its object the provision of a machine of this character which is capable of rapid and efficient operation.

Other objects will appear hereinafter.

The invention consists in the combinations and arrangements of parts hereinafter described and claimed.

Figure 1:
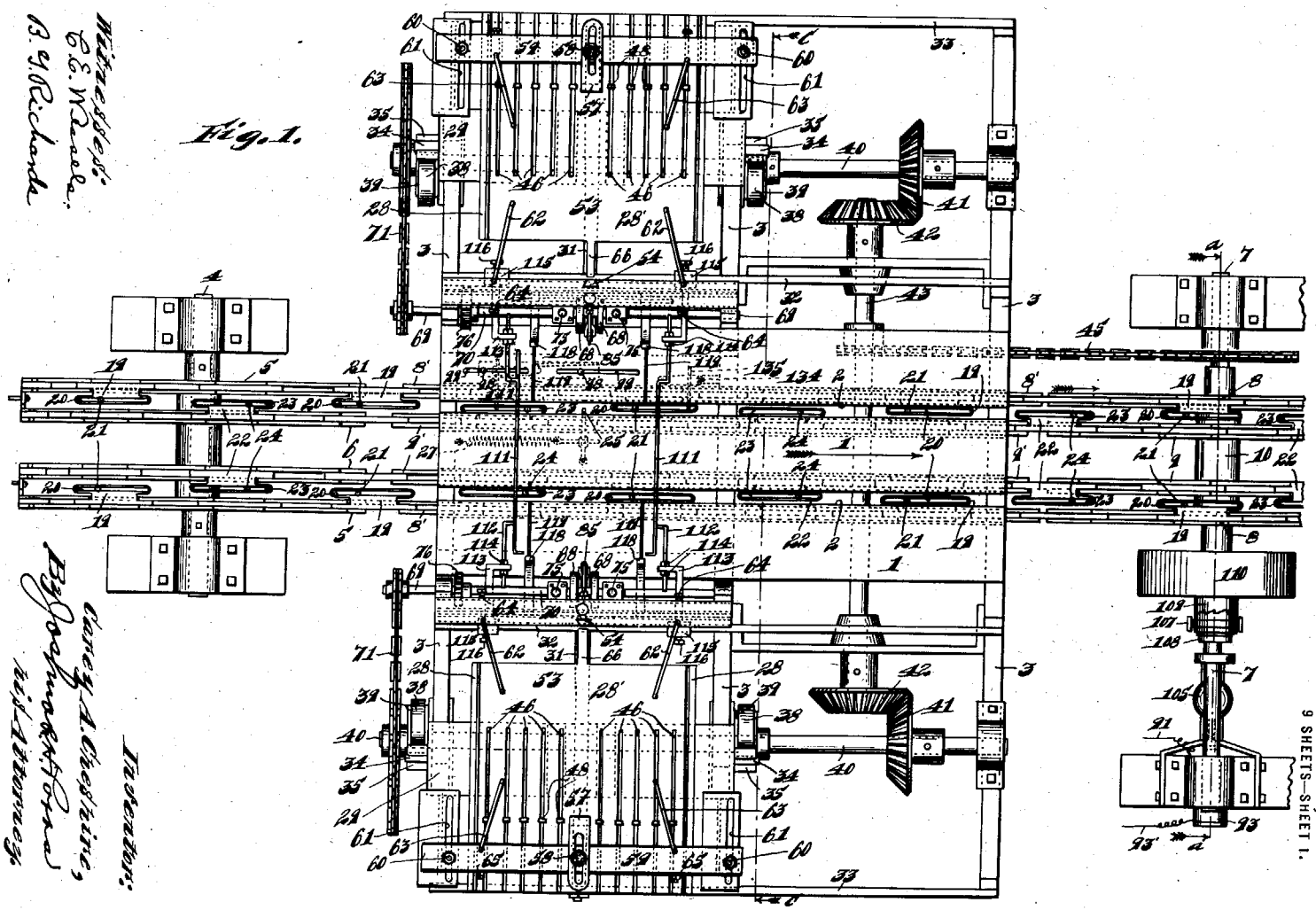
Figure 4:
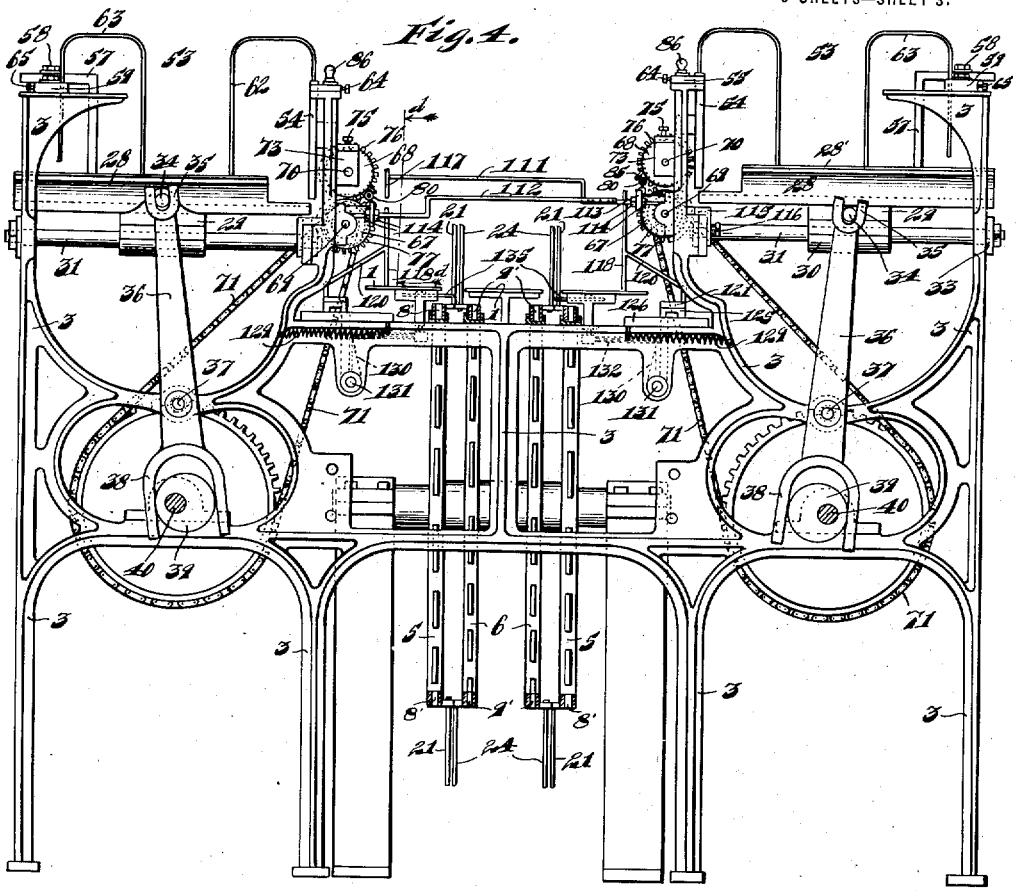
Figure 5:
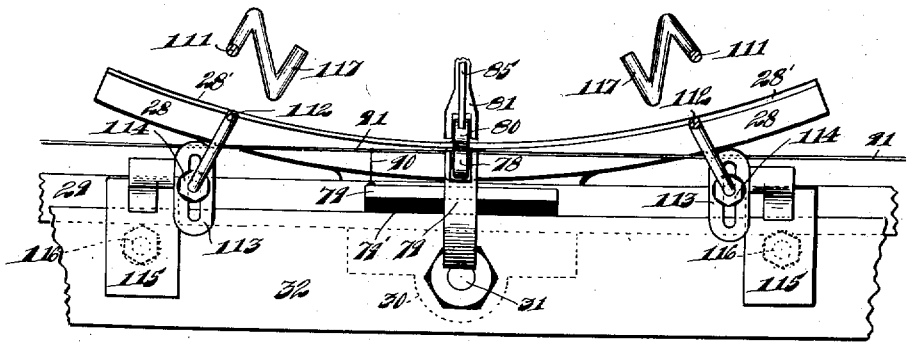
Figure 6:
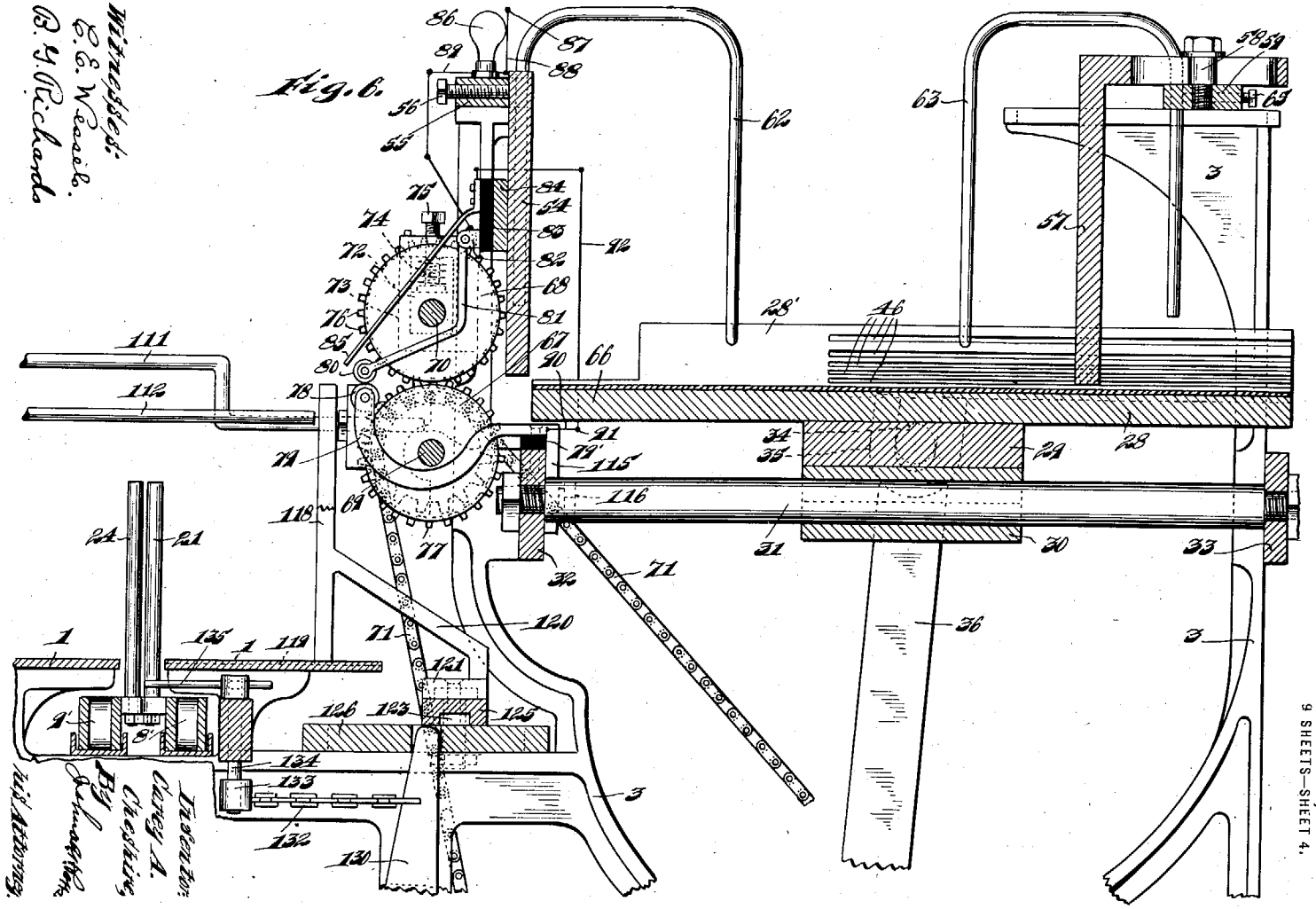
Figure 7:
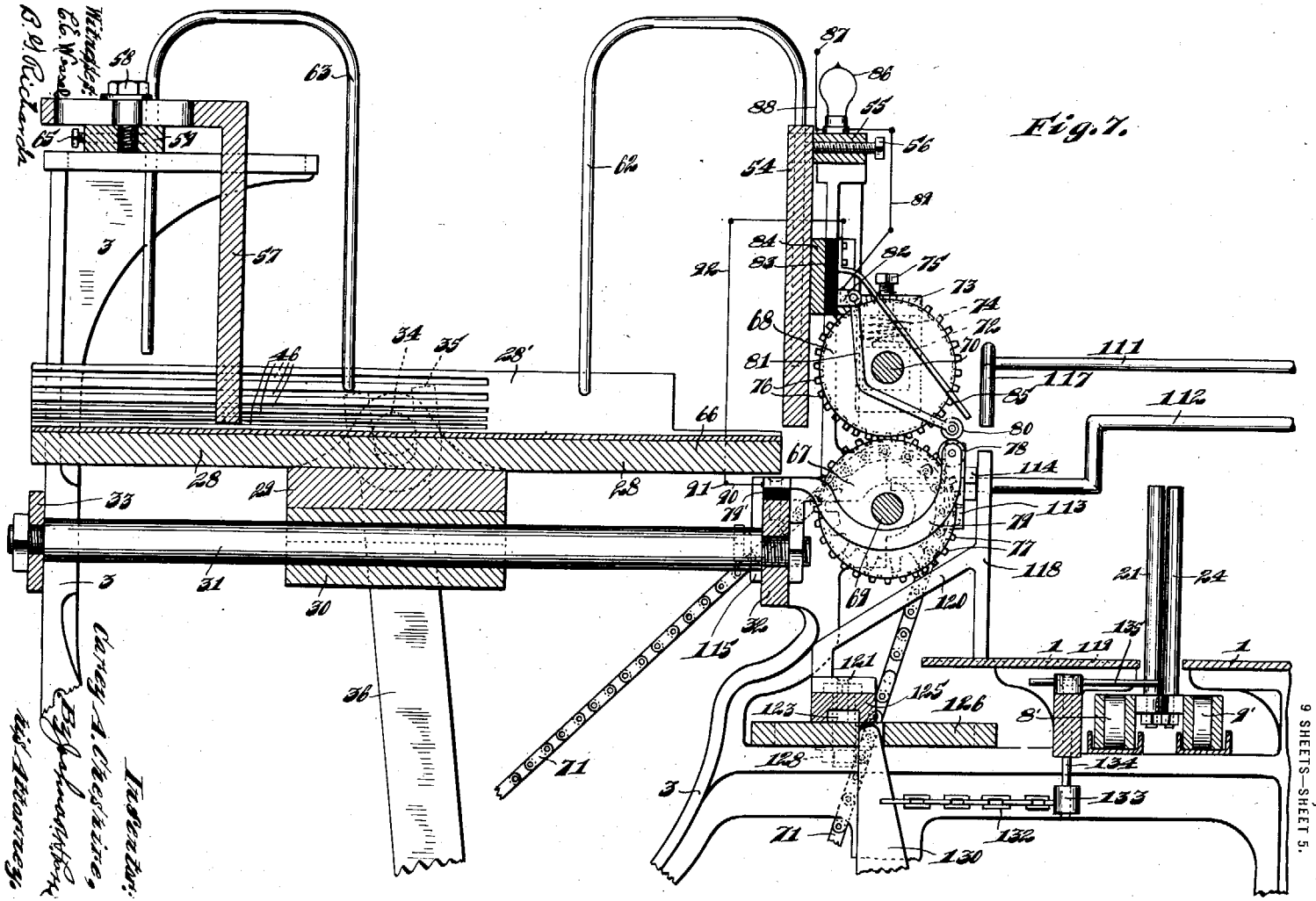
Figure 8:
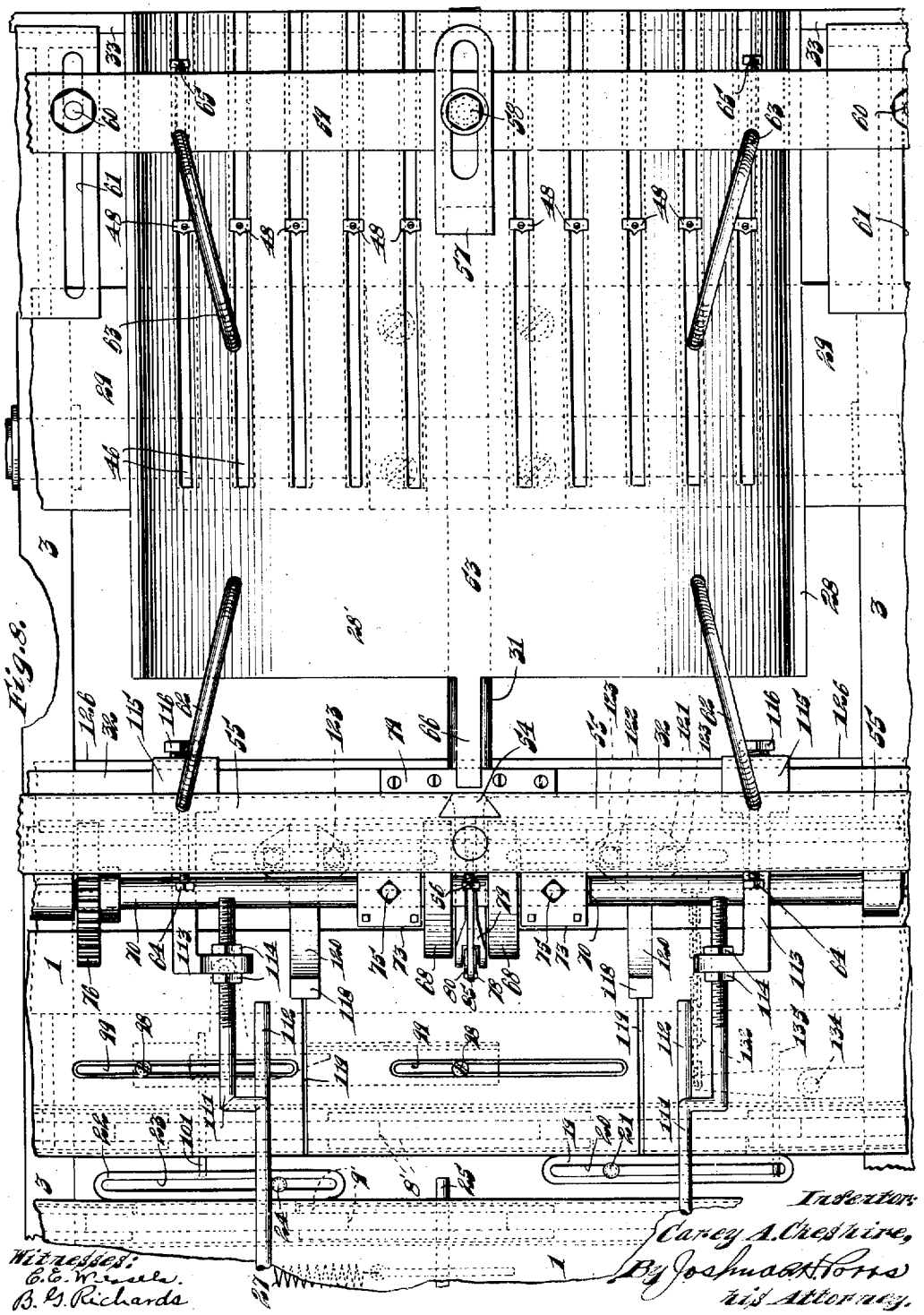
Figure 9:
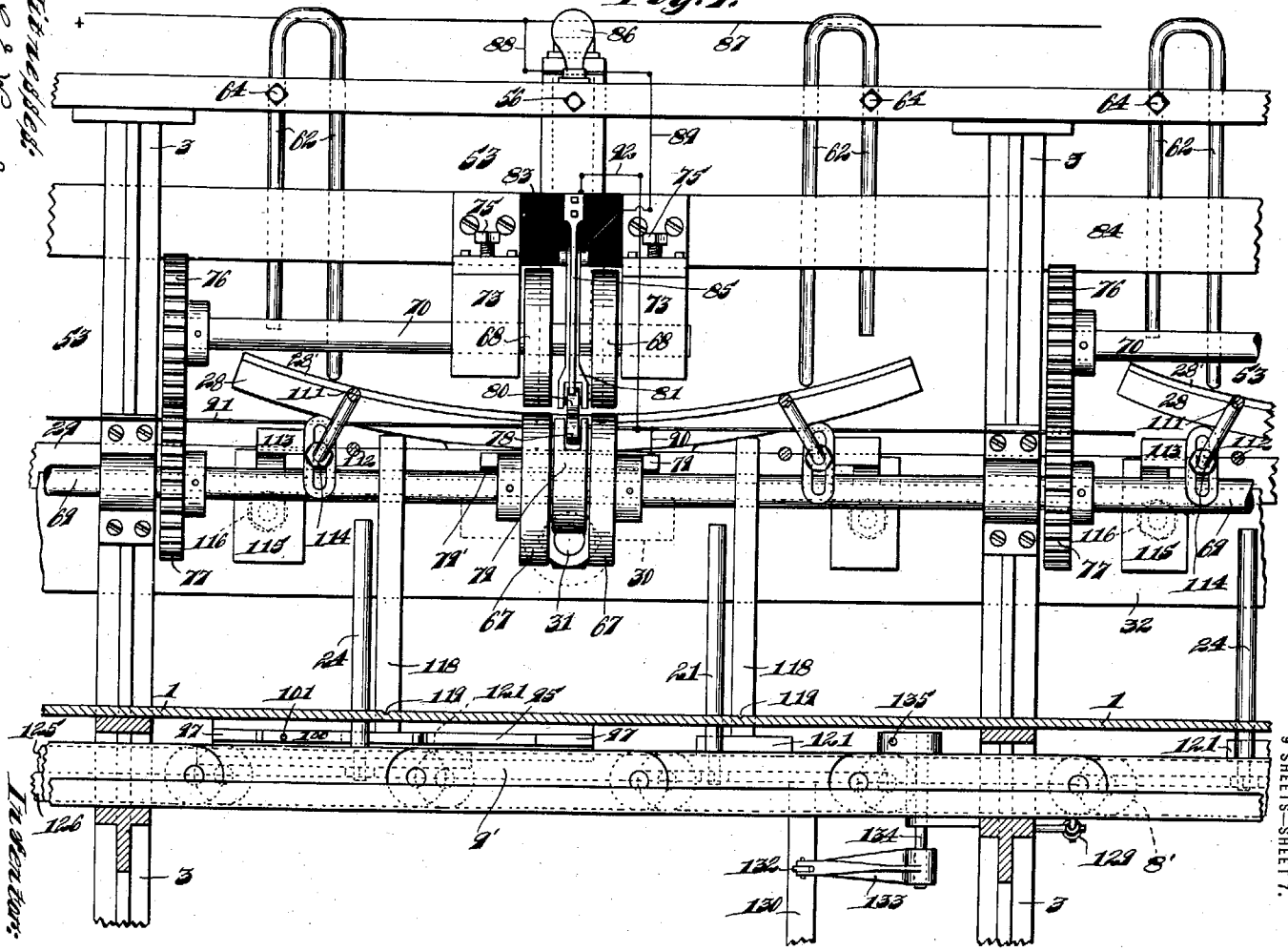
Figures 10, 11:
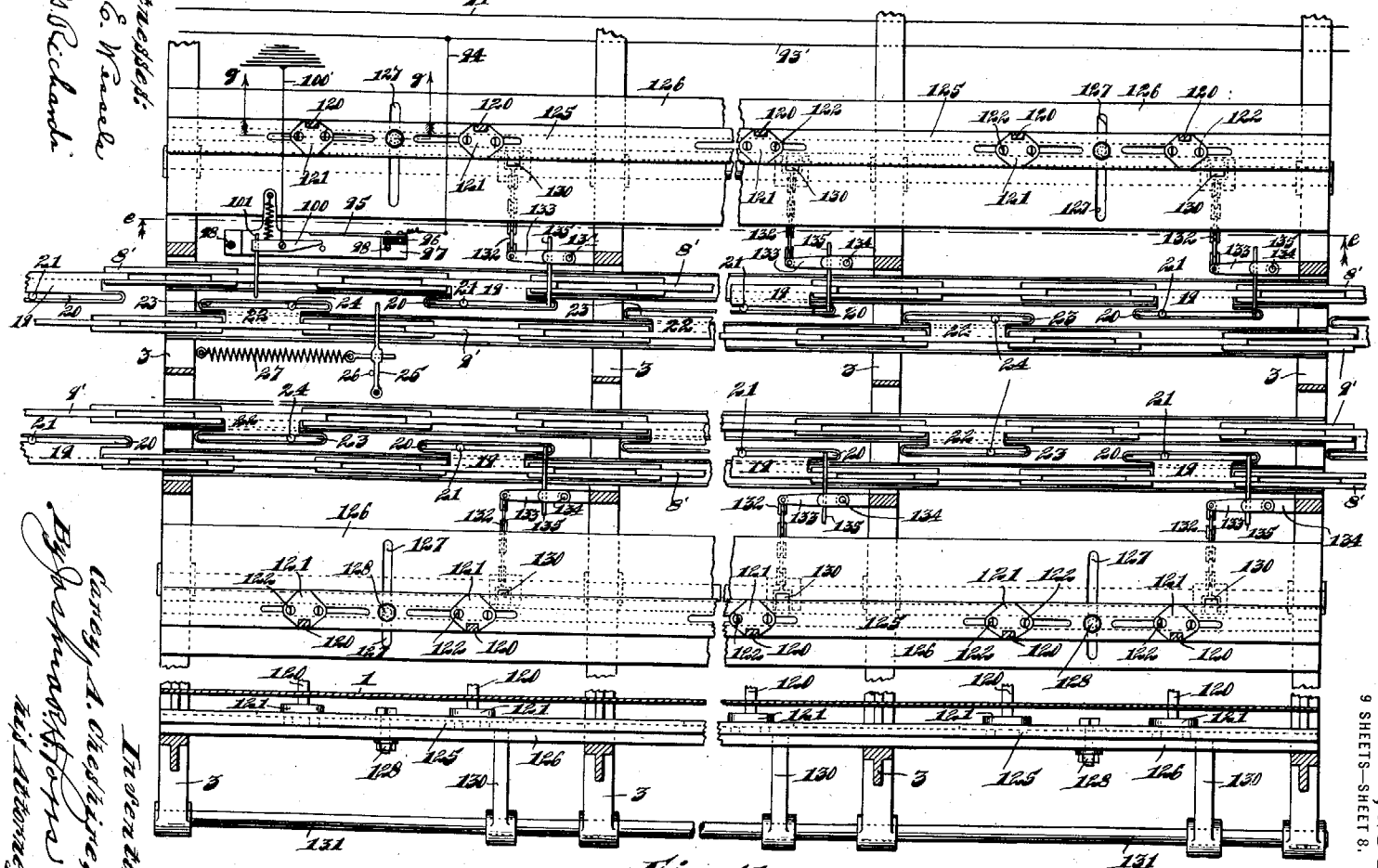
Figure 12:
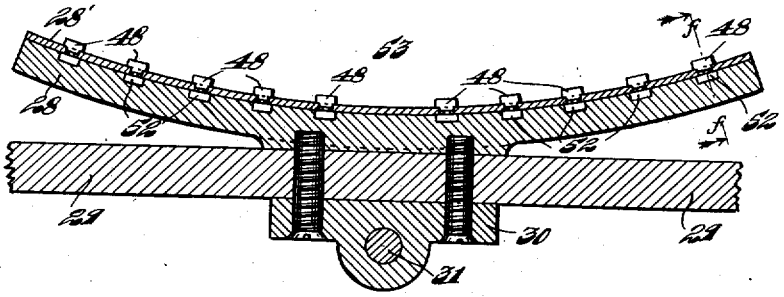
Figure 13:
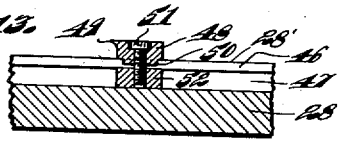
Figure 14:
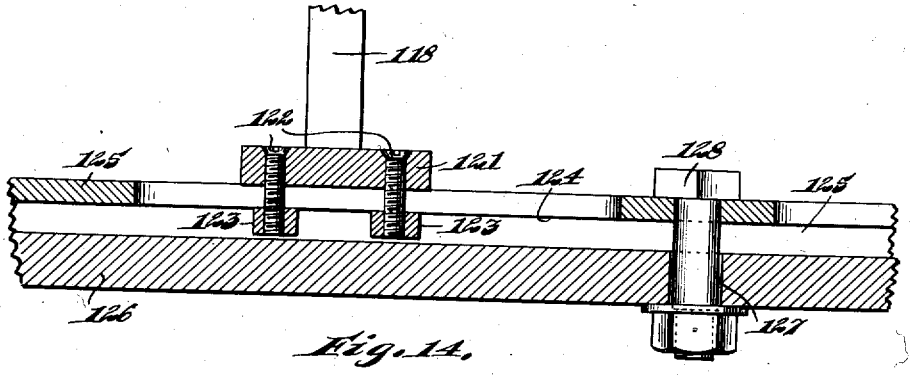

The invention will be best understood by reference to the accompanying drawings forming a part of this specification, and in which, Figure 1 is a top plan view of a portion of a machine embodying my invention and showing one complete pair of feeding mechanisms applied thereto, Fig. 2, an enlarged section taken on line *a—a* of Fig. 1, Fig. 3, an enlarged detail section taken on line *b—b* of Fig. 2, Fig. 4, a section taken on line *c—c* of Fig. 1, Fig. 5, a section taken on line *d—d* of Fig. 4, Fig. 6, an enlarged central vertical section taken through one of the feed hoppers employed in the machine, Fig. 7, a view similar to Fig. 6, but taken through the opposite feed hopper, Fig. 8, an enlarged top plan view corresponding to Fig. 6, Fig. 9, an enlarged partial longitudinal section taken centrally of the machine and showing a face view of one complete hopper, Fig. 10, an enlarged horizontal section of a portion of the machine taken immediately under the supporting table thereof, Fig. 11, a section taken on line *e—e* of Fig. 10, Fig. 12, an enlarged transverse section through one of the reciprocatory base plates employed in the feed hopper, Fig. 13, an enlarged section taken on line *f—f* of Fig. 12, and Fig. 14, an enlarged section taken on line *g—g* of Fig. 10.

The preferred form of construction as illustrated in the drawings comprises a suitable supporting table 1 which is provided with longitudinal slots 2 extending throughout its entire length and is suitably supported on frames or stands 3 as shown in Figs. 1, 4 and 6. A supporting shaft 4 is arranged adjacent and below one end of table 1 and a pair of sprocket wheels 5 are fixed to supporting shaft 4, as shown in Fig. 1. Between sprocket wheels 5 a pair of sprocket wheels 6 are loosely mounted on shaft 4 as shown in Fig. 1. A driving shaft 7 is mounted adjacent and below the opposite end of table 1 and a pair of sprocket wheels 8 are fixed to shaft 7 in longitudinal alinement with sprocket wheels 5 so as to accommodate sprocket feed chains 8′ as shown in Fig. 1, said sprocket feed chains 8′ passing over sprockets 8 and 5. Another pair of sprocket wheels 9 are fixed to a sleeve 10 which is loosely mounted on shaft 7 in longitudinal alinement with sprocket wheels 6 so as to accommodate positioning chains 9′ as shown in Fig. 1, said positioning chains 9′ passing over sprocket wheels 6 and 9. Sleeve 10 is made somewhat larger than shaft 7 and collars 11 are arranged loosely on shaft 7 within the ends of said sleeve. Sleeve 10 and collars 11 are provided with registering circumferential slots 12 and 13 respectively and a pin 14 is passed through each set of said slots and secured in the shaft 7 as shown in Fig. 3. Sleeve 10 carries set screws 15 by means of which said sleeve may be adjustably secured to collars 11. The space between collars 11 is occupied by a coiled spring 16, one end 17 of said spring being secured to sleeve 10 and the other end 18 being secured to shaft 7. The arrangement is such, as will be observed, that spring 16 will normally hold sleeve 10 in its forward position, that is with the rear side of slot 12 resting against the rear of pin 14 as shown in Fig. 3, but in case sprocket wheels 9 be momentarily held from rotation, spring 16 will yield and permit said sprocket wheels 9 to remain stationary until the forward side of pin 14 engages the forward edge of slot 13, whereupon wheels 9 are rigidly connected with shaft 7 and the power of said shaft will be directly transmitted to said sprocket wheels 9 to cause the overcoming of any extraordinary resistance placed thereon and the travel of said sprocket wheels 9 and consequently of sprocket chains 9′. It will also be observed that when sprocket wheels 9 are relieved from such extraordinary resistance spring 16 will serve to accelerate their movement and cause said sprocket wheels 9 to assume their original relation on shaft 7, as shown in Fig. 3. By adjusting sleeve 10 relatively to collars 11 as indicated in Fig. 3, the extent of this retarding possibility of sprocket wheels 9 and chains 9′ may be adjusted within the range of slots 12 and 13.

Arranged on sprocket chains 8′, as shown in Figs. 1, 6 and 10, are transversely registering supporting lugs 19, each of said lugs being provided with a longitudinal slot 20 and an upstanding pin 21 adjustably mounted in said slot. Likewise the chains 9′ are provided with tranversely registering supporting lugs 22 having longitudinal adjusting slots 23 and upstanding pins 24 adjustable in slots 23. Pins 21 and 24 project upwardly through the slots 2 in table 1, pins 21 being arranged just outside of the paths of pins 24, as shown. A yieldable stop arm 25 is pivoted to the bottom of table 1 and set with its free end in the path of pins 24, said arm 25 being yieldingly held in normal position against a stop pin 26 by means of an adjustable spring 27. The arrangement is such, that when one of the pins 24 encounters the free end of arm 25, the spring 27 is strong enough to overcome the spring 16 and cause the chains 9′ and sprocket wheels 9 to remain stationary until the forward side of pin 14 strikes the forward edge of slot 13, whereupon the resistance of spring 27 is overcome by the direct application of power from shaft 7 and the corresponding pin 24 caused to pass stop arm 25 and the travel of chains 9′ is resumed as explained above. By this arrangement, it will be observed that articles which are being pushed along table 1 by feed pins 21 may be nicely positioned against said feed pins by stopping pins 24 sufficiently to contact with the forward edges of said articles, provided pins 21 and 24 have been adjusted so as to normally occupy positions a little farther apart than the corresponding dimensions of said articles.

A plurality of reciprocatory concave feed plates 28 are slidably mounted on opposite sides of table 1 somewhat above said table and in transversely registering pairs as shown in Figs. 1, 4, 9 and 10. The plates 28 on one side of the table are arranged at a slightly higher elevation than those on the other but said plates are all identical in form and function and the description of one and its coöperating parts will suffice for all. All of the plates 28 on each side of the machine are carried by a longitudinally extending supporting bar 29 which extends the full length of table 1, there being one of said bars on each side of said table. Each of the bars 29 is provided on its bottom with a plurality of bearings 30 which are slidably mounted on guiding and supporting rods 31 which are secured in supporting bars 32 and 33 mounted on frames 3 and extending the full length of table 1. At each end each of the bars 29 carries an operating pin 34 engaging a fork 35 on the upper end of a rocker bar 36 pivoted at 37 to the corresponding end frame 3. At its lower end each of the rocker bars 36 is provided with a fork 38 embracing an eccentric 39 secured to a shaft 40 extending the full length of table 1 and suitably mounted in the frames 3 as indicated, there being a shaft 40 arranged under each of the supporting bars 29. At one end each of the shafts 40 carries a beveled gear 41 meshing with a corresponding bevel gear 42 on the corresponding end of a countershaft 43 arranged transversely under table 1 and driven from power shaft 7 by means of a sprocket chain 45, as will be readily understood. By this arrangement, it will be observed that as power shaft 7 rotates to cause travel of chains 8′ and 9′ and consequently of pins 21 and 24, shafts 40 will be rotated to cause eccentrics 39 to operate rock bars 36 to reciprocate supporting members 29 and consequently plates 28 simultaneously toward and away from table 1. The gearing is such that the feed plates 28 will make a complete reciprocation as each set of pins 21 and 24 passes the corresponding plate.

The upper surface of plate 28 is covered by a thin sheet metal plate 28′ which is provided with a plurality of longitudinal slots 46 in the rear portion thereof, and the upper surface of plate 28 is provided with a corresponding number of grooves or channels 47 registering with slots 46 but somewhat wider as shown in Figs. 1, 6, 7, 8, 9, 12 and 13. A feed member 48 provided with an engaging portion 49 on its forward side is mounted on plate 28′ over each of the slots 46, each of said members 48 being provided with a square projection 50 projecting into and fitting the corresponding slot 46. A square threaded block or nut 52 is slidably arranged in the corresponding groove 47 under the corresponding member 48 and is secured to said stop member by means of a screw bolt 51. By this arrangement it will be observed, that by tightening or loosening screw 51 the corresponding member 48 may be secured in adjusted positions in the corresponding groove 46.

Arranged over each of the plates 28 as shown in Figs. 1, 4, 6, 7, 8 and 9 is an adjustable feed hopper 53 adapted to contain a pile or stack of book sections. The inner or discharge side of said hopper is formed by a vertically adjustable stop bar 54 which is slidably mounted in a dovetail groove in a supporting bar 55 traversing the front portions of said hoppers and suitably supported on frames 3, a set screw 56 being provided for each of the stop bars 54 in order to secure the same in adjusted positions. The outer or rear side of the hopper 53 is formed by an angular member 57 which is adjustably secured by means of a bolt 58 with a supporting bar 59 traversing the rear of said hoppers and suitably supported on frame members 3. Supporting bar 59 is adjustably secured in position on frame members 3 by means of bolts 60 engaging through slots 61 provided in said frame members for this purpose. The sides of the hoppers are formed by substantially U-shaped rods 62 and 63, the rods 62 being pivotally mounted in bar 55 and rods 63 being pivotally mounted in bar 59. Said rods 62 are adjustably secured in position by means of set screws 64 and rods 63 by means of set screws 65. By this arrangement it will be observed that the dimensions of the hopper over each of the plates 28 may be readily adjusted to different sizes of book sections, and that upon reciprocation of plate 28 members 48 will engage the bottommost section of a stack of sections arranged in the hopper and move the forward edge of said bottommost section beyond stop bar 54, said stop bar 54 being adjusted to permit the passage of said edge but to prevent the passage of any of the upper book sections.

Each of the plates 28 is provided with a forwardly projecting central finger 66 which is adapted to pass between feed rollers 67 and 68 and deliver the book section removed to said feed rollers as shown in Figs. 1, 4, 6, 7, 8 and 9. The feed rollers 67 are arranged in pairs, there being one of said feed rollers on each side of the path of the corresponding finger 66, and all of the rollers 67 being fixed to a longitudinal shaft 69 extending along the front of each set of hoppers and suitably mounted on frames 3 as shown. The rollers 68 are arranged in pairs to correspond with rollers 67, but each pair of rollers 68 is mounted on a separate shaft 70 arranged above shaft 69, the shaft 69 being driven from the corresponding shaft 40 by means of a sprocket chain 71 as will be readily understood. Each of the individual shafts 70 is mounted in vertically slidable bearing blocks 72 slidable in bearings 73 and yieldingly pressed toward shaft 69 by means of springs 74 whose pressure is rendered adjustable by means of set screws 75. Each of the shafts 70 carries a pinion 76 meshing with a pinion 77 on the corresponding shaft 69, said gears serving to rotate the shafts 70 positively in unison with the corresponding shaft 69. By this arrangement it will be observed that at each reciprocation of plate 28, the bottommost section of a stack in the corresponding hopper will be delivered to the corresponding feed rollers 67 and 68 and rapidly withdrawn from the corresponding hopper, the yieldable mounting of shaft 70 accommodating book sections of different thicknesses within the range of the teeth on gears 76 and 77.

A small supporting metallic roller 78 as shown in Figs. 6 and 7 is arranged just beyond each set of feed rollers 67 and 68 and between said rollers in position to support the central portion of a book section feeding through said feed rollers, said roller 78 being supported on a curved supporting arm 79 which is secured to a block 79′ of insulating material mounted on the top of supporting bar 32. A riding roller 80 is arranged immediately over roller 78 and is carried by an upwardly swinging arm 81 which is mounted in a bracket 82 secured to a block of insulating material 83 mounted on a supporting bar 84 as shown. Arranged above and beyond roller 80 is a contact arm 85 which is adjustably secured to block 83 in position to be engaged by roller 80 in case said roller is lifted a considerable distance from the corresponding roller 78. An electric signal light 86 is arranged on bar 55 centrally in front of each of the hoppers 53 and an electric feed wire 87 is arranged along the top of each set of hoppers and connected with each of the lights 86 by means of a branch wire 88. A branch wire 89 leads from the other terminal of each of the lights 86 to the corresponding bracket 82, thus placing roller 80 in circuit with the corresponding light 86. A branch wire 90 connects each of the supporting arms 79 with a wire 91 extending along each set of hoppers on each side of the machine and each of the contact members 85 is connected with wire 91 by means of a branch wire 92. Each of the wires 91 leads to the same terminal of an electro-magnet 93 and a wire 93′ leads from the other terminal of said electro-magnet along the side of table 1 and is connected by a branch wire 94 with a spring contact 95 secured to a block 96 of insulating material carried by a frame 97 arranged on the upper left hand corner of Fig. 10. Frame 97 is adjustably secured to the under side of table 1 by means of screw bolts 98 taking through longitudinal slots 99 in said table as illustrated in Figs. 1 and 8. Frame 97 carries a spring-held bell-crank lever, one arm 100 of which is arranged to be swung into contact with spring contact 95 and the other arm 101 of said bell crank being extended into the path of the pins 21 on the corresponding chain 8′. Bell crank 100—101 is grounded by means of a branch wire 100′ or other suitable means. The frame 97 is so adjusted on table 1 that one of the pins 21 will engage arm 101 at the same time that a book section is passing between rollers 78 and 80, said book section thus constituting an insulation between said rollers.

If for any reason, owing to the exhaustion of the pile or stack of sections in any hopper, or to other causes, a book section should fail to feed through rollers 78 and 80 at the proper time, roller 80 will make contact with roller 78 at the same time that arm 100 makes contact with spring contact 95. If these contacts are made simultaneously the current will flow from supply wire 87 through branch wire 88, thence through light 86 and branch wire 89 to arm 81 and roller 80, then through roller 78, arm 79, branch wire 90, and wire 91 to electro-magnet 93. From electro-magnet 93 the current will flow through the wire 93′ to branch wire 94 and spring contact 95. From contact 95 the current will flow through arm 100 and branch wire 100′ to the ground thus completing an operative circuit through the corresponding light 86 and the electro-magnet 93 and operating light 86 to notify the operator where the trouble is and simultaneously operating magnet 93 to stop the machine as will be explained more fully hereinafter. On the other hand if two book sections should accidentally feed from any one of the hoppers, the roller 80 will be forced outwardly into contact with member 85 and thus close a circuit from wire 87 to roller 80 as before, thence through member 85 and branch wire 92 to wire 91 and thence through the electro-magnet as before. Thus, it will be observed, that in case no book section feeds from any one of the hoppers at the proper time, or in case two or more book sections should feed therefrom, an electric circuit through the corresponding light and the electro-magnet 93 will be closed to notify the operator as to which hopper is defective and to stop the machine pending a remedy.

The core or armature 102 of the electro-magnet 93, as shown in Fig. 2 carries a catch 103 engaging a notch 104 in a ball weight 105, catch 103 being held in latching position by means of a spring 106. Ball weight 105 is mounted on one arm of a bell crank 107, the other arm of said bell crank being operatively connected with a clutch member 108 which is splined or feathered on the power shaft 7 of the machine. Clutch member 108 coöperates with a clutch member 109 secured to a driving pulley 110 loosely mounted on shaft 7. By this arrangement, it will be observed, that upon excitation of magnet 93 as explained above, catch 103 will be withdrawn and weight 105 permitted to fall. The fall of weight 105 disengages clutch 108 from clutch 109 and thus disengages the power shaft from the driving pulley 110 stopping the machine as mentioned above.

Leading from each of the hoppers on the right hand side of the machine as shown in Fig. 4 is a pair of supporting guide rods 111 and a similar pair of guide rods 112 leads from each of the hoppers on the other side of the machine. Each of the guide rods 111—112 is carried by a bracket 113 which is provided with a vertical slot in which said rod is rendered vertically adjustable by means of lock nuts 114 as shown in Fig. 8. Each of the brackets 113 is provided with a clamp 115 slidably mounted on supporting bars 32 and adjustably secured thereto by means of a set screw 116. The outer ends of guide rods 111 are bent at right angles thereto and formed sinuously as shown to constitute stops for a book section sliding on said guide rods. The guide rods 111 and 112 are so arranged with respect to their respective hoppers and feed plates 28 that they will serve to support the edges of a book section being fed from the corresponding hopper in its curved condition, thus stiffening the book section to facilitate the feed thereof. The rods are rendered adjustable both vertically and laterally so as to adapt them for use with different sizes of book sections. It will be observed that, by this arrangement as long as the inner portion of a book section is engaged by rollers 67 and 68 said book section will be supported by the corresponding guide rods 111—112 in its curved position, but that as soon as the book section is freed from the corresponding feed rollers, said book section will be free to bend further and thus fall through said guide rods onto table 1 between corresponding sets of pins 21 and 24.

Two lateral positioning members 118, as shown in Figs. 6, 7 and 8 are arranged on each side of table 1 adjacent each pair of hoppers, the lower ends of said positioning members 118 being provided with V-shaped projections sliding in shallow V-shaped slots 119 in the top of table 1, the positioning members 118 on the right hand side of the machine, as shown in Fig. 4, extending high enough to constitute stops for guide rods 112 as indicated. Each of the positioning members 118 is carried by a bracket 120 having a foot 121 secured by screw bolts 122 and nuts 123 to a longitudinal bar 125 extending along the corresponding side of the machine. This adjustable connection is effected by providing T-slots 124 in bar 125 and mounting nuts 123 in the lower portion of said slots as will be readily understood. Bar 125 is adjustably mounted on a laterally reciprocating bar or plate 126 by means of slots 127 and bolts 128. By this arrangement it will be observed that positioning members 118 may be adjusted either longitudinally of table 1 or transversely thereof to accommodate different sizes of book sections thereon.

Each of the bars 126, as shown best in Figs. 4, 6 and 7 is mounted to reciprocate transversely of the machine on the frame members 3 and is normally held outwardly from said table by means of springs 129. Rocker arms 130 which are secured at intervals to rocker shafts 131 have their upper ends engaging suitable slots in the corresponding bars 126. Each of the rocker arms 130 is connected by a chain 132 with an arm 133 fixed to a shaft 134 mounted under table 1. Each of the shafts 134 carries an operating arm 135 set in the path of pins 21. The parts are so positioned that at the same time chains 9′ are being retarded to position book sections against pins 21 as explained above, the arms 135 will be engaged by the corresponding pins 21 and operated to rock the shafts 131 to cause rocker arms 130 to move bars 126 and members 118 toward each other to engage the book sections laterally and position them in this direction also.

In use the machine is provided with enough feed hoppers to accommodate all of the different sections of the book which it is desired to assemble. Then, stacks or piles of these different book sections are arranged in the different hoppers preferably, where possible, with their folded edges to the rear with reference to the direction of feed on table 1 and commencing with the first book section arranged in the lower hopper at the end of the machine where the pins 21 and 24 enter the slots in table 1. The next section is arranged in the opposite hopper, the third section in the next adjacent lower hopper, the fourth section in the hopper opposite and so on until all sections have been provided for. Then the machine is started and as each set of pins 21 and 24 pass each pair of hoppers, a pair of book sections will be deposited and properly positioned therebetween by the automatic action of the parts as explained above. Thus, when the set of pins 21 and 24 which receive as their first sections, sections one and two of the book as explained above, arrives at the delivery end of the machine, it will contain a complete assembled book, and all sets of pins thereafter will contain a completely assembled book as long as the hoppers are kept supplied with the proper sections and barring accidents. In case of an accident at any one of the hoppers, the machine is stopped at once and notice given the operator as to where the difficulty lies. When the properly assembled books arrive at the delivery end of the machine they may be removed by hand or other suitable agents.

While I have illustrated and described the preferred form of construction for carrying my invention into effect, this is capable of variations and modifications without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. An assembling machine comprising a conveyer and feeding mechanisms arranged on opposite sides of said conveyer and operating to deposit articles thereon in piles, substantially as described.

2. An assembling machine comprising a conveyer and feeding mechanisms arranged in pairs with the members of each pair on opposite sides of said conveyer opposite each other at different elevations and operating to deposit articles thereon in piles, substantially as described.

3. An assembling machine comprising a conveyer and feeding mechanisms arranged on opposite sides of said conveyer and operating to deposit articles thereon in piles; each of said feeding mechanisms comprising a hopper and a reciprocatory member adapted to engage the outer edge of the bottommost member of a pile of articles in said hopper, substantially as described.

4. An assembling machine comprising a conveyer and feeding mechanisms arranged on opposite sides of said conveyer at different elevations and operating to deposit articles thereon in piles; each of said feeding mechanisms comprising a hopper and a reciprocatory member adapted to engage the outer edge of the bottommost member of a pile of articles in said hopper, substantially as described.

5. An assembling machine comprising a conveyer and feeding mechanisms arranged on opposite sides of said conveyer and operating to deposit articles thereon in piles; each of said feeding mechanisms comprising a hopper and a reciprocatory plate curved transversely with respect to the direction of reciprocation and having feed members adapted to engage the outer edge of the bottommost member of a pile of articles in said hopper, substantially as described.

6. An assembling machine comprising a conveyer and feeding mechanisms arranged on opposite sides of said conveyer at different elevations and operating to deposit articles thereon in piles; each of said feeding mechanisms comprising a hopper and a reciprocatory plate curved transversely with respect to the direction of reciprocation and having feed members adapted to engage the outer edge of the bottommost member of a pile of articles in said hopper, substantially as described.

7. An assembling machine comprising a conveyer and feeding mechanisms arranged on opposite sides of said conveyer and operating to deposit articles thereon in piles; each of said feeding mechanisms comprising a hopper, a reciprocatory plate curved transversely with respect to the direction of reciprocation and having feed members adapted to engage the outer edge of the bottommost member of a pile of articles in said hopper and means for reciprocating said plates substantially simultaneously, substantially as described.

8. An assembling machine comprising a conveyer and feeding mechanisms arranged on opposite sides of said conveyer at different elevations and operating to deposit articles thereon in piles; each of said feeding mechanisms comprising a hopper, a reciprocatory plate curved transversely with respect to the direction of reciprocation and having feed members adapted to engage the outer edge of the bottommost member of a pile of articles in said hopper and means for reciprocating said plates substantially simultaneously, substantially as described.

9. A machine of the class described comprising a conveyer and feeding mechanisms coöperating therewith, each of said feeding mechanisms comprising a hopper and a reciprocating plate curved transversely with respect to the direction of reciprocation and having feed members adapted to engage the outer edge of the bottommost member of a pile of articles in said hopper, substantially as described.

10. An assembling machine comprising a slotted supporting table, a traveling member arranged under said table, upwardly projecting feed members on said traveling member, projecting through the slot in said table and arranged to push articles along said table, and feeding mechanisms arranged on opposite sides of said conveyer and operating to deposit articles thereon in piles; each of said feeding mechanisms comprising a hopper and a reciprocatory member adapted to engage the outer edge of the bottommost member of a pile of articles in said hopper, substantially as described.

11. An assembling machine comprising a slotted supporting table, a traveling member arranged under said table, upwardly projecting feed members on said traveling member, projecting through the slot in said table and arranged to push articles along said table, and feeding mechanisms arranged on opposite sides of said conveyer at different elevations and operating to deposit articles thereon in piles; each of said feeding mechanisms comprising a hopper and a reciprocatory member adapted to engage the outer edge of the bottommost member of a pile of articles in said hopper, substantially as described.

12. An assembling machine comprising a slotted supporting table, a traveling member arranged under said table, upwardly projecting feed members on said traveling member, projecting through the slot in said table and arranged to push articles along said table, and feeding mechanisms arranged on opposite sides of said conveyer and operating to deposit articles thereon in piles; each of said feeding mechanisms comprising a hopper, and a reciprocatory plate curved transversely with respect to the direction of reciprocation and having feeding members adapted to engage the outer edge of the bottommost member of a pile of articles in said hopper, substantially as described.

13. An assembling machine comprising a slotted supporting table, a traveling member arranged under said table, upwardly projecting feed members on said traveling member, projecting through the slot in said table and arranged to push articles along said table, and feeding mechanisms arranged on opposite sides of said conveyer at different elevations and operating to deposit articles thereon in piles; each of said feeding mechanisms comprising a hopper, and a reciprocatory plate curved transversely with respect to the direction of reciprocation and having feeding members adapted to engage the outer edge of the bottommost member of a pile of articles in said hopper, substantially as described.

14. An assembling machine comprising a slotted supporting table, a traveling member arranged under said table, upwardly projecting feed members on said traveling member, projecting through the slot in said table and arranged to push articles along said table, and feeding mechanisms arranged on opposite sides of said conveyer and operating to deposit articles thereon in piles; each of said feeding mechanisms comprising a hopper, a reciprocatory plate curved transversely with respect to the direction of reciprocation and having feeding members adapted to engage the outer edge of the bottommost member of a pile of articles in said hopper and means for reciprocating said plates, substantially simultaneously, substantially as described.

15. An assembling machine comprising a slotted supporting table, a traveling member arranged under said table, upwardly projecting feed members on said traveling member, projecting through the slot in said table and arranged to push articles along said table, and feeding mechanisms arranged on opposite sides of said conveyer at different elevations and operating to deposit articles thereon in piles; each of said feeding mechanisms comprising a hopper, a reciprocating plate curved transversely with respect to the direction of reciprocation and having feeding members adapted to engage the outer edge of the bottommost member of a pile of articles in said hopper and means for reciprocating said plates substantially simultaneously, substantially as described.

16. An assembling machine comprising a conveyer; a plurality of pairs of feed hoppers arranged with the members of each pair on opposite sides of said conveyer; a reciprocatory base plate for each hopper concaved transversely with respect to the direction of reciprocation; feeding members on each of said base plates arranged to engage the outer edge of the bottommost article of a pile of articles in the corresponding hopper; feed rollers arranged to engage said article to discharge it onto said conveyer; and means for reciprocating said base plates, substantially as described.

17. An assembling machine comprising a conveyer; a plurality of pairs of feed hoppers arranged with the members of each pair on opposite sides of said conveyer; a reciprocatory base plate for each hopper concaved transversely with respect to the direction of reciprocation; feeding members on each of said base plates arranged to engage the outer edge of the bottommost article of a pile of articles in the corresponding hopper; feed rollers arranged to engage said article to discharge it onto said conveyer; and means for reciprocating said base plates substantially simultaneously, substantially as described.

18. An assembling machine comprising a conveyer; a plurality of pairs of feed hoppers arranged with the members of each pair on opposite sides of said conveyer; a reciprocatory base plate for each hopper transversely concaved with respect to the direction of reciprocation; feeding members on each of said base plates arranged to engage the outer edge of the bottommost article of a pile of articles in the corresponding hopper; feed rollers arranged to engage said article to discharge it onto said conveyer; members arranged to support a discharging article in curved position until free of said rollers; and means for reciprocating said base plates, substantially as described.

19. An assembling machine comprising a conveyer; a plurality of pairs of feed hoppers arranged with the members of each pair on opposite sides of said conveyer; a reciprocatory base plate for each hopper transversely concaved with respect to the direction of reciprocation; feeding members on each of said base plates arranged to engage the outer edge of the bottommost article of a pile of articles in the corresponding hopper; feed rollers arranged to engage said article to discharge it onto said conveyer; members arranged to support a discharging article in curved position until free of said rollers; and means for reciprocating said base plates substantially simultaneously, substantially as described.

20. An assembling machine comprising a slotted supporting table; a traveling member arranged under said table; upwardly projecting feed members on said traveling member projecting through the slot in said table and arranged to push articles along said table; a plurality of pairs of feed hoppers arranged with the members of each pair on opposite sides of said conveyer; a reciprocatory base plate for each hopper transversely concaved with respect to the direction of reciprocation; feeding members on each of said base plates arranged to engage the outer edge of the bottommost article of a pile of articles in the corresponding hopper; feed rollers arranged to engage said article to discharge it onto said conveyer; and means for reciprocating said base plates, substantially as described.

21. An assembling machine comprising a slotted supporting table; a traveling member arranged under said table; upwardly projecting feed members on said traveling member projecting through the slot in said table and arranged to push articles along said table; a plurality of pairs of feed hoppers arranged with the members of each pair on opposite sides of said conveyer; a reciprocatory base plate for each hopper transversely concaved with respect to the direction of reciprocation; feeding members on each of said base plates arranged to engage the outer edge of the bottommost article of a pile of articles in the corresponding hopper; feed rollers arranged to engage said article to discharge it onto said conveyer; and means for reciprocating said base plates substantially simultaneously, substantially as described.

22. An assembling machine comprising a slotted supporting table; a traveling member arranged under said table; upwardly projecting feed members on said traveling member projecting through the slot in said table and arranged to push articles along said table; a plurality of pairs of feed hoppers arranged with the members of each pair on opposite sides of said conveyer; a reciprocatory base plate for each hopper transversely concaved with respect to the direction of reciprocation; feeding members on each of said base plates arranged to engage the outer edge of the bottommost article of a pile of articles in the corresponding hopper; feed rollers arranged to engage said article to discharge it onto said conveyer; members arranged to support a discharging article in curved position until free of said rollers; and means for reciprocating said base plates, substantially as described.

23. An assembling machine comprising a slotted supporting table; a traveling member arranged under said table; upwardly projecting feed members on said traveling member projecting through the slot in said table and arranged to push articles along said table; a plurality of pairs of feed hoppers arranged with the members of each pair on opposite sides of said conveyer; a reciprocatory base plate for each hopper transversely concaved with respect to the direction of reciprocation; feeding members on each of said base plates arranged to engage the outer edge of the bottommost article of a pile of articles in the corresponding hopper; feed rollers arranged to engage said article to discharge it onto said conveyer; members arranged to support a discharging article in curved position until free of said rollers; and means for reciprocating said base plates substantially simultaneously, substantially as described.

24. An assembling machine comprising a substantially horizontal slotted supporting table; a feed chain arranged under said table; feed members projecting upwardly from said chain through said table; a positioning chain under said table; positioning members on said positioning chain and porjecting through said slots to coöperate with said feed members; means for feeding articles onto said table between said members; automatic means for momentarily stopping said positioning chain to position said articles longitudinally; reciprocatory lateral positioning means arranged at opposite sides of said table; and automatic means for causing said lateral positioning means to approach each other, substantially as described.

25. The combination of a slotted supporting table; a shaft arranged at each end and below said table, one of said shafts constituting a supporting shaft and the other a driving shaft; independent sprocket wheels on said supporting shaft; a sprocket wheel fixed to said driving shaft; a sprocket wheel having limited movement on said driving shaft; a feed chain passing over said fixed sprocket wheel and one of said sprocket wheels on the supporting shaft; a positioning chain passing over the other sprocket wheels; projections on said chains projecting upwardly through the slot in said table; means for temporarily interrupting the movement of said positioning chain; and means for feeding articles onto said table between said projections, substantially as described.

In testimony whereof I have signed my name to this specification in the presence of two subscribing witnesses.

CAREY A. CHESHIRE.

Witnesses:

JOSHUA R. H. POTTS,

HELEN F. LILLIS.